United States Patent
Maruta

(10) Patent No.: US 7,872,703 B2
(45) Date of Patent: Jan. 18, 2011

(54) DISPLAY MODULE SUPPORTING STRUCTURE

(75) Inventor: Naoto Maruta, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 6 days.

(21) Appl. No.: 12/228,780

(22) Filed: Aug. 15, 2008

(65) Prior Publication Data

US 2009/0051847 A1   Feb. 26, 2009

(30) Foreign Application Priority Data

Aug. 20, 2007   (JP) ............................. 2007-213713

(51) Int. Cl.
*G02F 1/1333* (2006.01)
(52) U.S. Cl. .......................................... 349/58; 349/60
(58) Field of Classification Search .................. 349/58, 349/60
See application file for complete search history.

(56) References Cited

U.S. PATENT DOCUMENTS

| | | | | |
|---|---|---|---|---|
| 5,663,867 | A * | 9/1997 | Honda et al. ........... | 361/679.32 |
| 6,879,096 | B1 * | 4/2005 | Miyazaki et al. ............. | 313/495 |
| 2002/0024499 | A1 * | 2/2002 | Karidis et al. ............... | 345/156 |
| 2002/0043607 | A1 | 4/2002 | Tajima | |
| 2002/0153836 | A1 | 10/2002 | Oishi | |
| 2004/0123501 | A1 * | 7/2004 | Safavi et al. .................. | 40/452 |
| 2004/0165060 | A1 * | 8/2004 | McNelley et al. ........ | 348/14.08 |
| 2005/0116644 | A1 | 6/2005 | Kim | |
| 2005/0117304 | A1 | 6/2005 | Kim | |
| 2005/0151451 | A1 | 7/2005 | Chen et al. | |
| 2005/0180098 | A1 | 8/2005 | Kim | |
| 2005/0212982 | A1 | 9/2005 | Soga | |
| 2005/0236548 | A1 | 10/2005 | Maruta | |
| 2005/0237438 | A1 | 10/2005 | Maruta | |
| 2005/0264985 | A1 | 12/2005 | Kim et al. | |
| 2006/0075934 | A1 * | 4/2006 | Ram ............................ | 108/44 |

(Continued)

FOREIGN PATENT DOCUMENTS

EP   1777955 A   4/2007

(Continued)

OTHER PUBLICATIONS

Japanese Notice of the reason for refusal, dated Jul. 29, 2009.

(Continued)

*Primary Examiner*—K. Cyrus Kianni
(74) *Attorney, Agent, or Firm*—Yokoi & Co. U.S.A., Inc.; Toshiyuki Yokoi

(57) ABSTRACT

A display module supporting structure including a display module having a circuit board carried on a rear surface thereof, a intermediate support members being interposed between a rear surface of the display module and an external support member for supporting the display module from the outside of the display module, the intermediate support members including first fixing surfaces fixed onto the rear surface of the display module, second fixing surfaces substantially parallel to the first fixing surfaces and formed in predetermined locations thereof with fixing portions for fixing the external support member, and connection surfaces interconnecting the first fixing surfaces and the second fixing surfaces and substantially perpendicular to the first fixing surfaces and the second fixing surfaces, and the intermediate support members being fixed to left and right locations on the rear surface outside the circuit board.

5 Claims, 7 Drawing Sheets

U.S. PATENT DOCUMENTS

2006/0107273 A1* 5/2006 Hisatomi et al. ............ 720/600
2006/0161964 A1* 7/2006 Chung ........................ 725/141
2006/0279189 A1 12/2006 Jeong
2008/0078733 A1* 4/2008 Nearman et al. ............ 211/189

FOREIGN PATENT DOCUMENTS

| | | |
|---|---|---|
| EP | 1783582 A | 5/2007 |
| JP | 2000-206901 A | 7/2000 |
| JP | 2001-013890 A | 1/2001 |
| JP | 2003-029643 A | 1/2003 |
| JP | 3116087 U | 10/2005 |
| JP | 2006-030310 A | 2/2006 |
| JP | 2008-241964 A | 10/2008 |

OTHER PUBLICATIONS

The extended European search report dated Jan. 29, 2010.

* cited by examiner

RELATED ART

RELATED ART

DISPLAY MODULE SUPPORTING STRUCTURE

CROSS-REFERENCES TO RELATED APPLICATIONS

The present application is related to the Japan Patent Application No. 2007-213713, filed Aug. 20, 2007, the entire disclosure of which is expressly incorporated by reference herein.

BACKGROUND OF THE INVENTION

1. Field of the Invention

The present invention relates to a display module supporting structure and electronic equipment employing the display module supporting structure.

2. Description of Related Art

FIG. 6 simply illustrates a liquid crystal module 1 (display module) employing a conventional display module supporting structure, when viewed from a rear side.

FIG. 7 simply shows a condition, where an entire device 9 (liquid crystal television) including the liquid crystal module 1 is supported by a wall 2, when viewed from a left side of the liquid crystal module 1.

To a rear surface 3 of the liquid crystal module 1, two brackets 4 serving as intermediate support members are fixed. The respective brackets 4 are arranged at locations symmetrical left to right, so as to interpose a center (an alternate long and short line in FIG. 6) of the rear surface 3 in conditions to straddle over a circuit board 8, carried on the rear surface 3, in an upper and lower direction. The terms upper, lower, left and right as used herein shall be based on upper, lower, left and right when the liquid crystal module 1 is viewed from a front side. The circuit board 8 is a board on which various circuits and electronic components for realizing operation of the liquid crystal module 1 are mounted.

The brackets 4 are substantially arch-shaped members made of sheet metal materials and generally include upper bridge leg portions 4a connected to an upper region of the rear surface 3, lower bridge leg portions 4b connected to a lower region of the rear surface 3, and connection bridge portions 4c interconnecting the upper bridge leg portions 4a and the lower bridge leg portions 4b. The upper bridge leg portions 4a and the lower bridge leg portions 4b are formed at ends thereof (forward end portions) with abutment surfaces 4a1, 4b1 for abutting against the rear surface 3. The brackets 4 are fixed to the rear surface 3 by causing the respective abutment surfaces 4a1, 4b1 to be screw-stopped onto the rear surface 3. When the brackets 4 are fixed to the rear surface 3, the connection bridge portions 4c become parallel to the rear surface 3.

As shown in FIG. 6, a plurality of screw-holes 4c1 are formed in the connection bridge portions 4c and surfaces of tip ends (rearward end portions) of the upper and lower bridge leg portions 4a, 4b. The screw-holes 4c1 are screw-holes which are to be used when a wall-hanging support member 5 (external support member) for fixing the liquid crystal television 9 to the wall 2, and the brackets 4 are fixed. In short, by causing the left and right brackets 4 to be fixed onto the rear surface 3, causing the wall-hanging support member 5 to be fixed with respect to rear sides of the left and right brackets 4 by screw-stopping using the screw-holes 4c1, and then causing the wall-hanging support member 5 to be fixed to the wall 2, the liquid crystal television 9 including the liquid crystal module 1 is supported in a wall-hung state. In an actual device, a front cabinet 6 is mounted to a front surface side of the liquid crystal module 1 and a rear cabinet 7 is mounted so as to cover the rear surface side of the liquid crystal module 1 including the brackets 4 (refer to an alternate long and two short dashes lines in FIG. 7). In portions of the rear cabinet 7 which positionally correspond to the screw-holes 4c1, through-holes 7a through which screws for fixing the brackets 4 and the wall-hanging support member 5 are to be inserted are formed.

Japanese Patent Application Laid-Open No. 2006-30310 discloses a technique in which a display device is wall-hooked and supported by a wall-hanging support device which includes a hook unit fixed to a rear cover of the display device and a plate unit fixed to a wall.

Also, Japanese Patent Application Laid-Open No. 2001-13890 discloses a display device fixing system which can fix a leg (rotary base) of a display device regardless of a size and shape of the leg.

Moreover, Japanese Patent Application Laid-Open No. 2000-206901 discloses a universal mount unit on the side of a display, which can be also used as a mounting fitting for wall-hooking, a mounting fitting for ceiling-mounting and a mounting fitting for a floor stand.

Also, Japanese Utility Model Registration No. 3116087 discloses a technique in which a TV body is supported through a stand, utilizing a bracket on the side of the body, which is attached to a front cabinet, and a support bracket which the stand has.

The structure in which the liquid crystal module 1 is supported by such substantially arch-shaped brackets 4 as to be described above has the following problems.

In short, the brackets 4 are fixed to the liquid crystal module 1 in the conditions to straddle the circuit board 8, so that heights of the components to be mounted on the circuit board 8 are restricted due to the presence of the connection bridge portions 4c passing above the circuit board 8. Concretely, it is necessary to make a height H1 with respect to predetermined components C located under the connection bridge portions 4c, which is measured from the circuit board 8, less than a height H2 as measured between the circuit board 8 and the connection bridge portions 4c when the circuit board 8 is carried on the rear surface 3. For this reason, it is occasionally necessary to cause the predetermined components C to be mounted on the circuit board 8 so as to be laid on the circuit board 8, thus making it difficult to design the circuit board 8 in which a plurality of electronic components, patterns, etc. aggregate densely.

Moreover, the place at which the circuit board 8 is arranged with respect to the rear surface 3 is limited to an area interposed between the upper bridge leg portions 4a and the lower bridge leg portions 4b, so that degrees of freedom in the arranging location of the circuit board 8 is reduced.

Moreover, it is necessary to fix the circuit board 8 to the liquid crystal module 1 prior to fixing of the brackets 4 and, when the circuit board 8 is to be removed from the liquid crystal module 1 after the brackets 4 are once fixed, it is necessary to previously remove the brackets 4, so that operabilities are considerably poor.

Moreover, at the time of forming the brackets 4, it is necessary to obtain spaces between the upper bridge leg portions 4a and the lower bridge leg portions 4b for allowing the circuit board 8 to be arranged therein, so that sheet metals for the brackets are forcedly cut away while being left at regions thereof which occupy between regions of the sheet metals, which correspond to the upper bridge leg portions 4a and the lower bridge leg portions 4b, and which correspond to the connection bridge portions 4c. The cut-away regions of the sheet metals are discarded without being used for the brackets 4, so that this is uneconomical and wastes resources.

Moreover, correspondingly to the regions of the sheet metals, between the regions of the sheet metals which correspond to the upper bridge leg portions 4a and the lower bridge leg portions 4c, which are considerably cut away while being left at the areas thereof corresponding to the connection bridge portions 4c, strengths of the entire brackets 4 are liable to be lowered.

Moreover, the connection bridge portions 4c are located in the rear of the circuit board 8, so that a thickness of the entire device including the liquid crystal module 1 is increased correspondingly to thicknesses D' of the connection bridge portions 4c themselves, thus providing one of the causes of preventing the device from being made thin.

Moreover, Japanese Patent Application Laid-Open Nos. 2006-30310, 2001-13890 and 2000-206901 which have been described above disclose means mounted to an exterior of a housing body of a display device for supporting the display device from the outside. However, the means are not adapted to solve the above problems that are brought about when the display module is supported utilizing the substantially arch-shaped brackets in the interior of the housing body of the display device. Similarly, the technique disclosed in Japanese Utility Model Registration No. 3116087 is not adapted to solve the above problems that are brought about when the display module is supported using the substantially arch-shaped brackets in the interior of the housing body of the display device.

BRIEF SUMMARY OF THE INVENTION

The present invention discloses a display module supporting structure and a liquid crystal television employing the structure, which allow a restriction on heights of electronic components mounted on a circuit board, as required in the prior art, to be relaxed, can improve degrees of freedom in an arranging location of the circuit board, enhance operabilities in mounting and removing of the circuit board, reduce the waste of materials to thereby save manufacturing cost, improve supporting strength and contribute to the reduction in a thickness of a product.

The display module supporting structure according to the present invention is provided with intermediate support members for supporting a display module housed within a housing body of a display device; the display module has a circuit board mounted on a rear surface of the display module; the intermediate support members are interposed between the rear surface of the display module and an external support member for supporting the display device from the outside of the housing body; said each intermediate support member comprising a first fixing surface fixed onto the rear surface of the display module, a second fixing surface substantially parallel to the first fixing surface and has fixing portions for fixing the external support member in predetermined locations of the second fixing surface, and a connection surface interconnecting the first fixing surface and the second fixing surface and substantially perpendicular to the first fixing surface and the second fixing surface; and the intermediate support members are fixed to left and right locations on the rear surface outside the circuit board.

According to the present invention, the intermediate support members are fixed to the left and right locations outside the circuit board carried on the rear surface of the display module, so that heights of the components mounted on the circuit board which are measured from the circuit board are not restricted as, in the prior art, they are by the brackets straddling over the circuit board. Moreover, degrees of freedom in the arranging location of the circuit board on the rear surface of the display module are improved as compared to the prior art and, particularly, degrees of freedom in the arranging location in the upper and lower direction on the rear surface is improved. Moreover, work in mounting of the circuit board with respect to the display module and removing of the circuit board from the display module can be freely performed any number of times, without being interfered with the intermediate support members. Moreover, it is unnecessary that the intermediate support members according to the present invention are formed in shapes in which, as in the prior art, the portions between the upper connection bridge leg portions and the lower connection bridge leg portions are cut away with the connection bridge portions being left, so that materials for the intermediate support members are not wasted and strengths of the intermediate support members are improved. Moreover, heights that are measured between the first fixing surfaces and the second fixing surfaces are sufficient, if they correspond to a height that is measured between the rear surface and the electronic components on the circuit board, so that the increase in the thickness of the device including the display module which is brought about due to the presence of the connection bridge portions as in the prior art is not brought about.

Each of the intermediate support members may be formed in such a manner that a corresponding connection surface rises up from an end portion of a corresponding first fixing surface that is arranged remote from the circuit board when the intermediate support member is fixed to the rear surface, and a corresponding second fixing surface projects in a direction opposite to the first fixing surface from an end portion of the connection surface that is opposite to an end portion of the connection surface that is connected to the first fixing surface, in such a manner that the connection surface is interposed between the first fixing surface and the second fixing surface. In short, the second fixing surfaces of the left and right intermediate support members are projected outside the circuit board, so that the second fixing surfaces and the circuit board are not at all interfered with one another. Therefore, the work in mounting of the circuit board and removing of the circuit board can be considerably smoothly performed.

The connection surfaces may have portions of different heights from the first fixing surfaces at end portions thereof opposite to end portions thereof connected to the first fixing surfaces. The second fixing surfaces may be connected to portions of the different height portions whose heights are highest, the heights being measured from the first fixing surfaces at end portions of the second fixing surfaces which are connected to the connection surfaces. In short, differences in level are provided at the end portions of the connection surfaces which are opposite to the end portions of the connection surfaces which are connected to the first fixing surfaces. Such a construction makes it possible, for example, to cause cables, etc. which make connection between components in the region, interposed by the intermediate support members, and components outside the same region, to pass the differences in level. Consequently, it is possible to store the cables, etc. on the side near the display module rather than the second fixing surfaces.

The connection surfaces may be formed in predetermined regions thereof with planar recess portions. If the planar recess portions are provided, the strengths of the intermediate support members are improved as compared to a case where the connection surfaces are made merely flat.

At least one of the first and second fixing surfaces of each of the intermediate support members may be formed in such a manner that an end portion of the at least one fixing surface which is opposite to an end portion thereof connected to a corresponding connection surface is bent entirely or partially. By causing the end portion to be bent in this way, the strengths of the intermediate support members are improved.

Incidentally, the external support member may be adapted to cause the display device to be supported in a wall-hung condition, and the second fixing surfaces may be adapted to fix the external support member utilizing the fixing portions thereof. Such a construction makes it possible to cause the display device to be strongly supported in a wall-hung condition, without wasting the materials used for the product.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character (s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. For example, such variations and alternate embodiments are contemplated, and can be made without departing from the spirit and scope of the invention.

An embodiment of the present invention will be discussed hereinafter with reference to the drawings.

Figure 1:
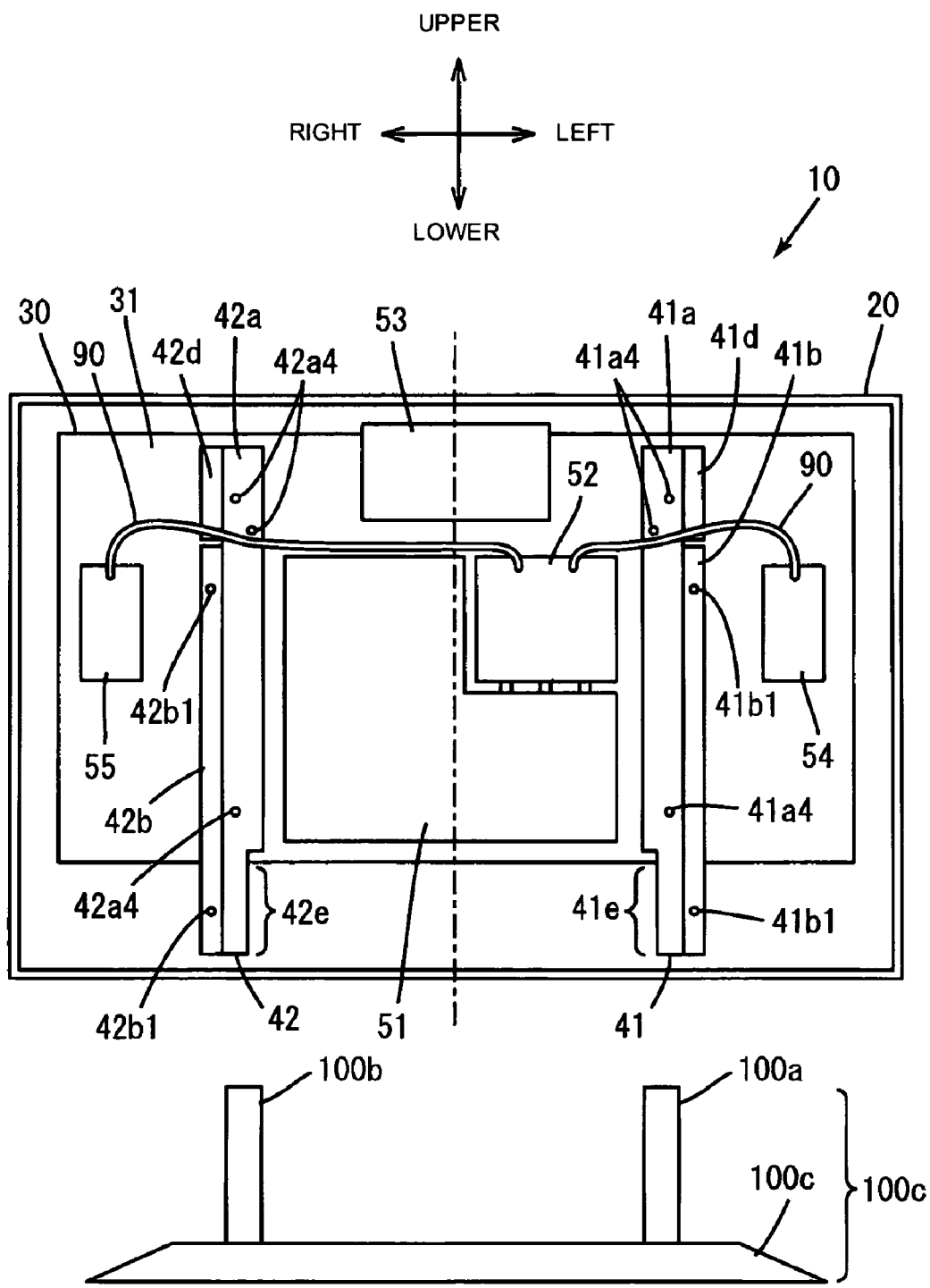
FIG. 1 is a rear view of an interior of a TV according to an embodiment of the present invention.

FIG. 1 simply shows an interior of a television 10 (hereinafter abbreviated as a TV), which is an example of electronic equipment employing a display module supporting structure, when viewed from a rear surface side. The TV 10 is an example of a display device. In FIG. 1, the interior of a front cabinet 20 serving as a part of a housing body of the TV 10 is shown. Within the front cabinet 20, a display module 30 is housed. In other words, the front cabinet 20 is mounted around the display module 30. The mounting of the front cabinet 20 may be realized, for example, by causing a frame-shaped member (not shown) covering upper, lower, left and right edge portions of the display module 30, and the front cabinet 20 to be screw-stopped at plural portions thereof.

In this embodiment, the terms "upper, lower, left and right" shall be based on upper, lower, left and right when the TV 10 is viewed from a front surface side.

In FIG. 1, a rear surface 31 of the display module 30 is shown. In this embodiment, the display module 30 is a liquid crystal module. Therefore, it is not too much to say that the TV 10 is a liquid crystal TV. The liquid crystal module generally includes a liquid crystal panel on the front side and a backlight module on the rear side of the liquid crystal panel. Therefore, it is not too much to say that the rear surface 31 is a rear surface of the backlight module. It goes without saying that an opening for allowing a display panel (liquid crystal panel) of the display module 30 to be exposed to the outside is concealed by the display module 30 in FIG. 1 but it is formed in a front surface of the front cabinet 20.

On a substantially center region of the rear surface 31, circuit boards on which electronic components for realizing drive of the TV 10 are mounted are provided. A circuit board 51 is, for example, a board on which a power supply circuit of and a tuner circuit of the TV 10 are mounted. A circuit board 52 is, for example, a board on which 1-chip ICs, etc. for performing various digital signal processes that are required in order to realize image/audio outputting by the TV 10 are mounted. Moreover, a timing control circuit 53 is provided upward of the circuit boards 51, 52. The timing control circuit 53 is provided with a timing controller to which an image signal generated by the circuit board 52 is inputted and which outputs the image signal to the liquid crystal panel at a predetermined timing.

In the display module supporting structure according to this embodiment, intermediate support members 41, 42 are fixed at left and right locations of the rear surface 31 outside the circuit boards 51, 52. The intermediate support member 41 is fixed on the left side of the circuit boards 51, 52. The intermediate support member 42 is fixed on the right side of the circuit boards 51, 52. The intermediate support members 41, 42 are members, which are made from sheet metals, interposed between the rear surface side of the display module 30 and an external support member for supporting the TV 10 from the outside of the housing body, and support the display module 30, etc. The intermediate support members 41, 42 are attached to locations, which interpose an upper and lower center line (an alternate long and short dash line in FIG. 1) of the TV 10 therebetween and are substantially symmetrical left to right, with longitudinal directions thereof being oriented in the upper and lower direction.

Inverters 54, 55 are provided at locations outside a region on the rear surface 31 which is interposed between the two intermediate support members 41, 42. The inverters 54, 55 are connected to the circuit boards 51, 52 by cables 90. On the basis of control by the circuit boards 51, 52, electric power is supplied to a backlight with which the backlight module is provided in an interior thereof, to thereby cause the backlight to light up.

The intermediate support member 41 generally includes a first fixing surface 41a of an elongated plate-shape which substantially contacts the rear surface 31 and is fixed onto the rear surface 31, a second fixing surface 41b of an elongated plate-shape substantially parallel to the first fixing surface 41a, the second fixing surface 41b being formed in predetermined positions thereof with a plurality of fixing portions 41b1 for fixing a wall-hanging support member (a kind of the external support member), and a connection surface 41c of an elongated plate-shape which is a surface interconnecting the first fixing surface 41a and the second fixing surface 41b and substantially perpendicular to the first fixing surface 41a and the second fixing surface 41b.

The intermediate support member 42 generally includes a first fixing surface 42a of an elongated plate-shape which substantially contacts the rear surface 31 and is fixed onto the rear surface 31, a second fixing surface 42b of an elongated plate-shape substantially parallel to the first fixing-surface 42a, the second fixing surface 42b being formed in predetermined positions thereof with a plurality of fixing portions 42b1 for fixing the wall-hanging support member, and a connection surface of an elongated plate-shape which is a surface interconnecting the first fixing surface 42a and the second fixing surface 42b and substantially perpendicular to the first fixing surface 42a and the second fixing surface 42b.

In this embodiment, the fixing portions 41b1 and the fixing portions 42b1 are screw-holes penetrating the second fixing surface 41b and screw-holes penetrating the second fixing surface 42b, respectively. The first fixing surfaces 41a, 42a are also formed in predetermined positions thereof with a plurality of fixing portions 41a4, 42a4 for fixing the first fixing surfaces 41a, 42a onto the rear surface 31. The fixing portions 41a4 and the fixing portions 42a4 are also screw-holes penetrating the first fixing surface 41a and screw-holes penetrating the first fixing surface 42a, respectively.

The intermediate support member 41 and the intermediate support member 42 have shapes substantially symmetrical in the left and right direction. Therefore, an example of shapes of the intermediate support members will be discussed hereinafter by exemplarily referring to the intermediate support member 41.

Figure 2:
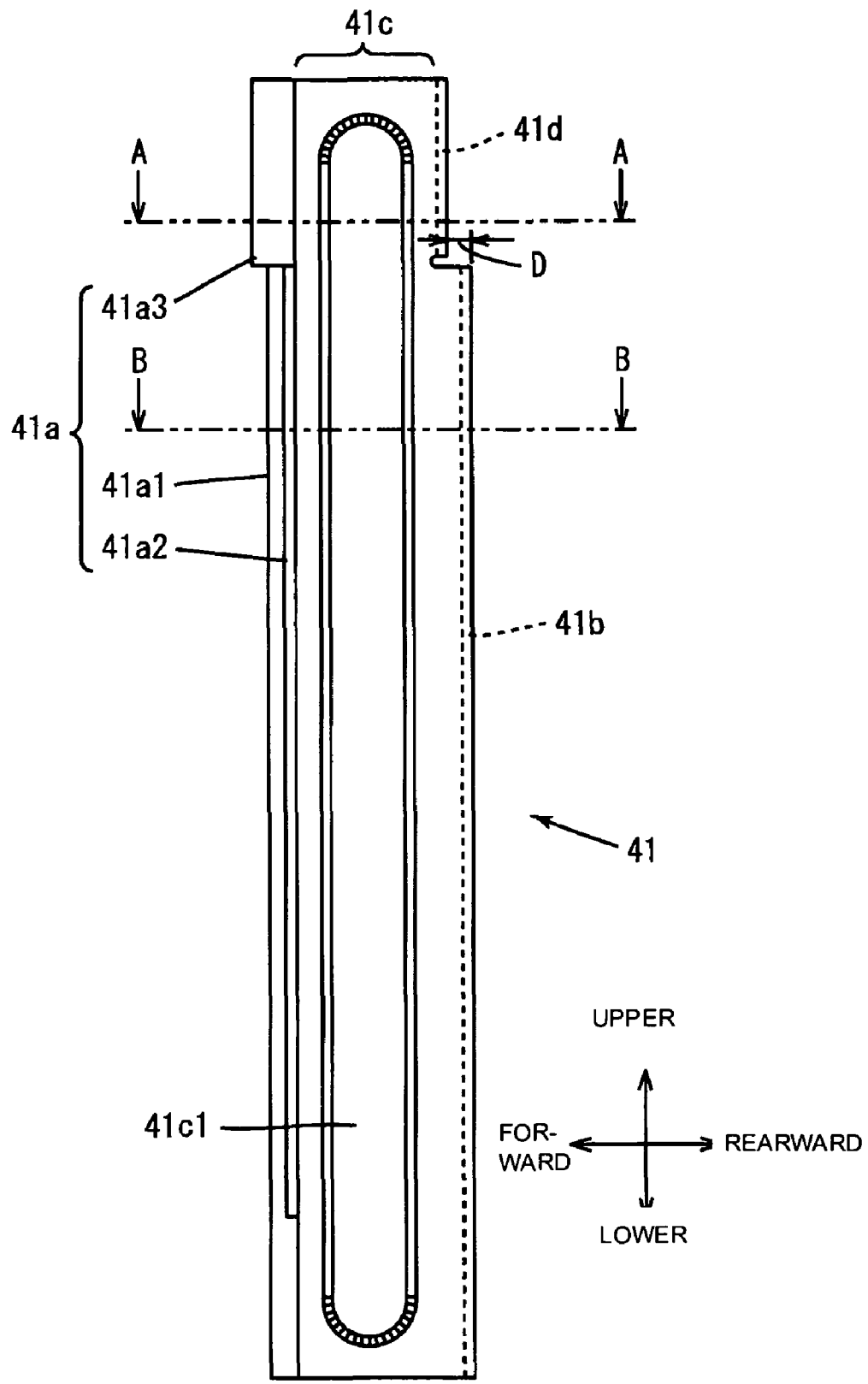
FIG. 2 is a side view of an intermediate support member.

FIG. 2 simply illustrates the intermediate support member 41 as viewed from a right side in the case of being fixed to the rear surface 31.

Figure 3:
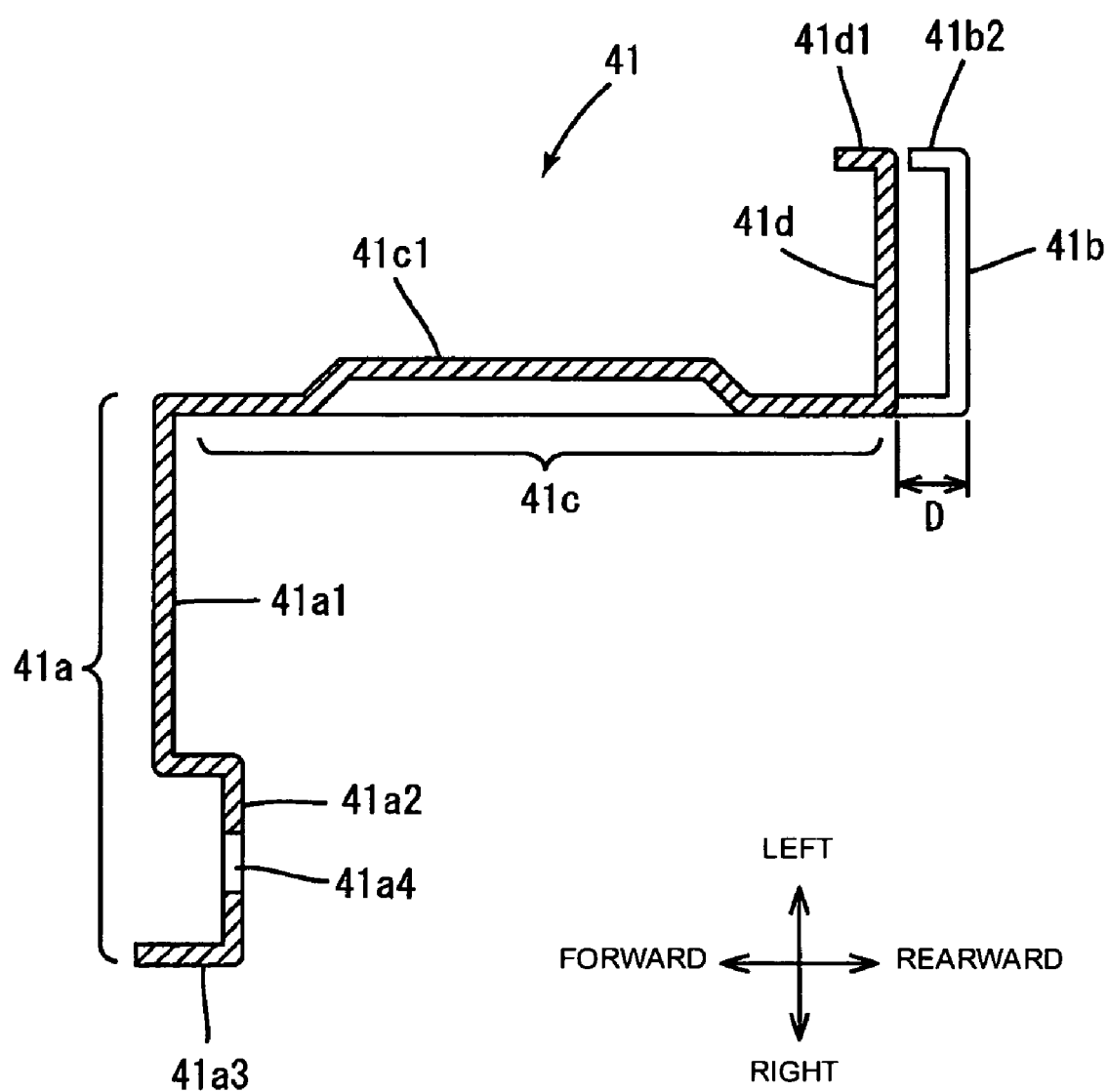
FIG. 3 is a sectional view of the intermediate support member, taken along a line A-A in FIG. 2.

FIG. 3 simply illustrates a sectional view taken along a line A-A in FIG. 2.

Figure 4:
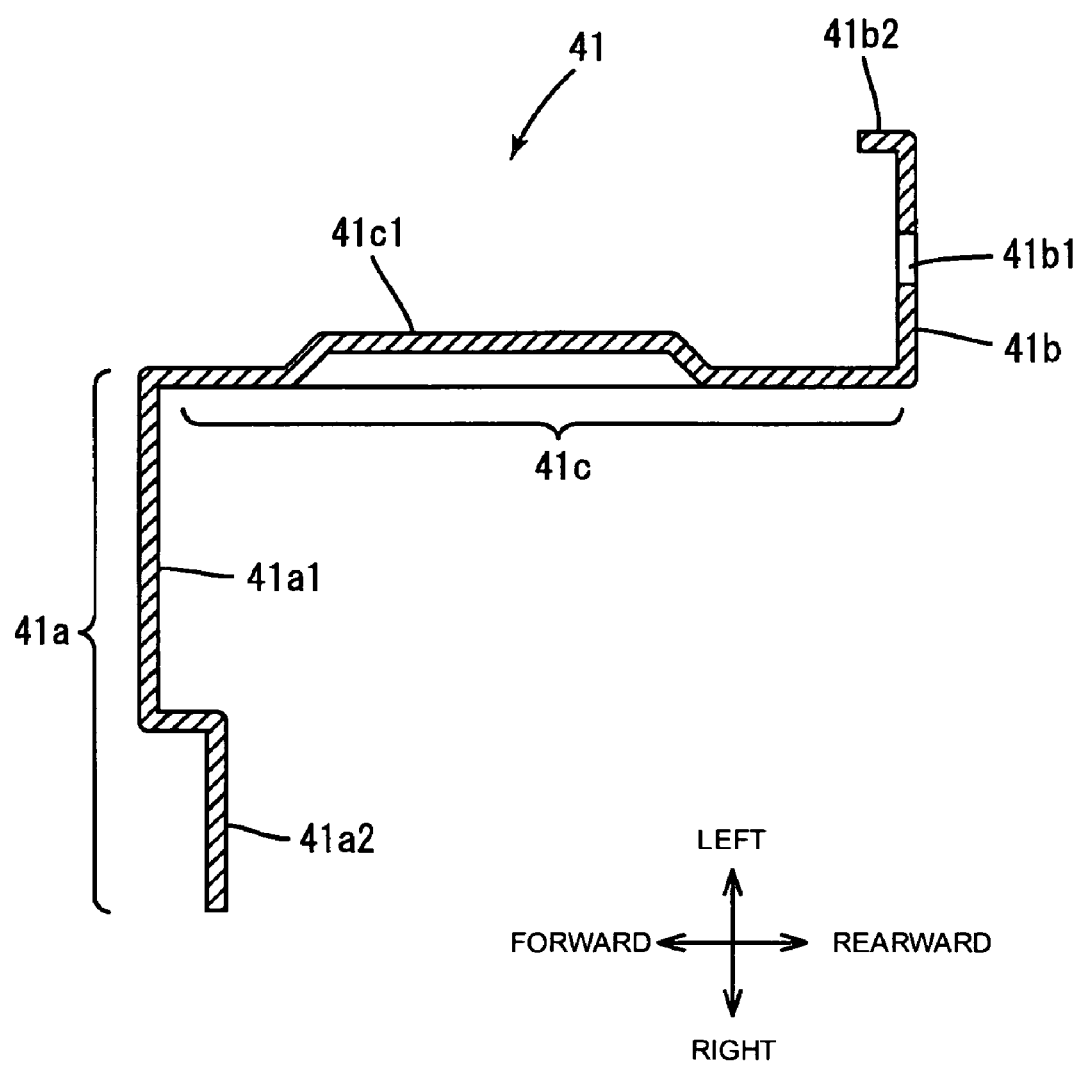
FIG. 4 is a sectional view of the intermediate support member, taken along a line B-B in FIG. 2.

FIG. 4 simply illustrates a sectional view taken along a line B-B in FIG. 2.

The connection surface 41c has front and rear end portions extending along the longitudinal direction thereof, to a substantially entire region of the front end portion of which the first fixing surface 41a is connected. The first fixing surface 41a entirely projects toward the right side from the connection surface 41c, namely, projects in such a direction as to approach the circuit boards 51, 52. To the rear end portion of the end portions extending along the longitudinal direction of the connection surface 41c, the second fixing surface 41b is connected. The second fixing surface 41b entirely projects toward the left side from the connection surface 41c, namely, projects in such a direction as to be away from the circuit boards 51, 52. Therefore, it is not too much to say that the intermediate support member 41 (42) has a substantially Z-shape in cross-section.

The connection surface 41c is provided, at an end portion thereof opposite to the end portion thereof connected to the first fixing surface 41a, with several portions (two portions in this embodiment) of different heights measured from the first fixing surface 41a. The second fixing surface 41b is connected to a substantially entire region of a higher height portion of such two different height portions. A surface 41d is connected to a substantially entire region of a lower height portion of the two different height portions. The surface 41d is a surface substantially parallel to the second fixing surface 41b and projects in such a direction as to be away from the circuit boards 51, 52, like the second fixing surface 41b. Between the second fixing surface 41b and the surface 41d, there is provided a difference D in level in a forward/rearward direction. Incidentally, the intermediate support member 42 is also formed with a surface 42d corresponding to the surface 41d.

The second fixing surface 41b and the surface 41d are formed with a bent tip portion 41b2 and a bent tip portion 41d1, respectively, which are formed by causing end portions thereof opposite to end portions thereof connected to the connection surface 41c, i.e., a tip end of the second fixing surface 41b and a tip end of the surface 41d to be bent at substantially right angles, respectively. The bent tip portion 41b2 may be formed over an entire region of the end portion of the second fixing surface 41b which is opposite to the end portion of the second fixing surface 41b which is connected to the connection surface 41c, or may be formed at a part of the region of the second fixing surface 41b. The bent tip portion 41d1 may be formed over an entire region of the end portion of the surface 41d which is opposite to the end portion of the surface 41d which is connected to the connection surface 41c, or may be formed at a part of the region of surface 41d. By causing the tip ends to be bent in this way, it is possible to enhance the strengths of the second fixing surface 41b and the surface 41d and, consequently, the strength of the entire intermediate support member 41 can be improved.

A planar recess portion 41c1 may be formed in the connection surface 41c. The recess portion 41c1 is formed by causing a substantially center region of the connection surface 41c to be dented by one step in the left side direction, relative to other locations of the connection surface 41c. By formation of such a recess portion 41c1, it is possible to enhance the strength of the connection surface 41c as compared to a case where the entire connection surface 41c is made merely flat and, consequently, the strength of the entire intermediate support member 41 can be improved.

Similarly, the first fixing surface 41a does not necessarily have a uniform surface shape. Some changes may be made to the first fixing surface. Concretely, as shown in FIGS. 3 and 4, the first fixing surface 41a has two different level surfaces (surface 41a1 and surface 41a2 found in the order of the locations near the connection surface 41c) formed by causing two portions in the middle of the first fixing surface 41a to be bent at substantially right angles. Each of the surfaces 41a1, 41a2 has the fixing portions 41a4. Moreover, by causing an end portion of the first fixing surface 41a which is opposite to an end portion of the first fixing surface 41a which is connected to the connection surface 41c, namely, a tip end portion of the surface 41a2 to be bent at substantially right angles, a bent tip portion 41a3 is formed. The bent tip portion 41a3 may be formed over an entire region of the end portion of the first fixing surface 41a which is opposite to the end portion of the first fixing surface 41a which is connected to the connection surface 41c, or may be formed at a part of the region of the end portion. In this way, the first fixing surface 41a is formed so as to have a plurality of different level surfaces and the tip end portion of the first fixing surface is bent, thus making it possible to enhance the strength of the first fixing surface 41a and, consequently, the strength of the entire intermediate support member 41 can be improved.

Figure 5:
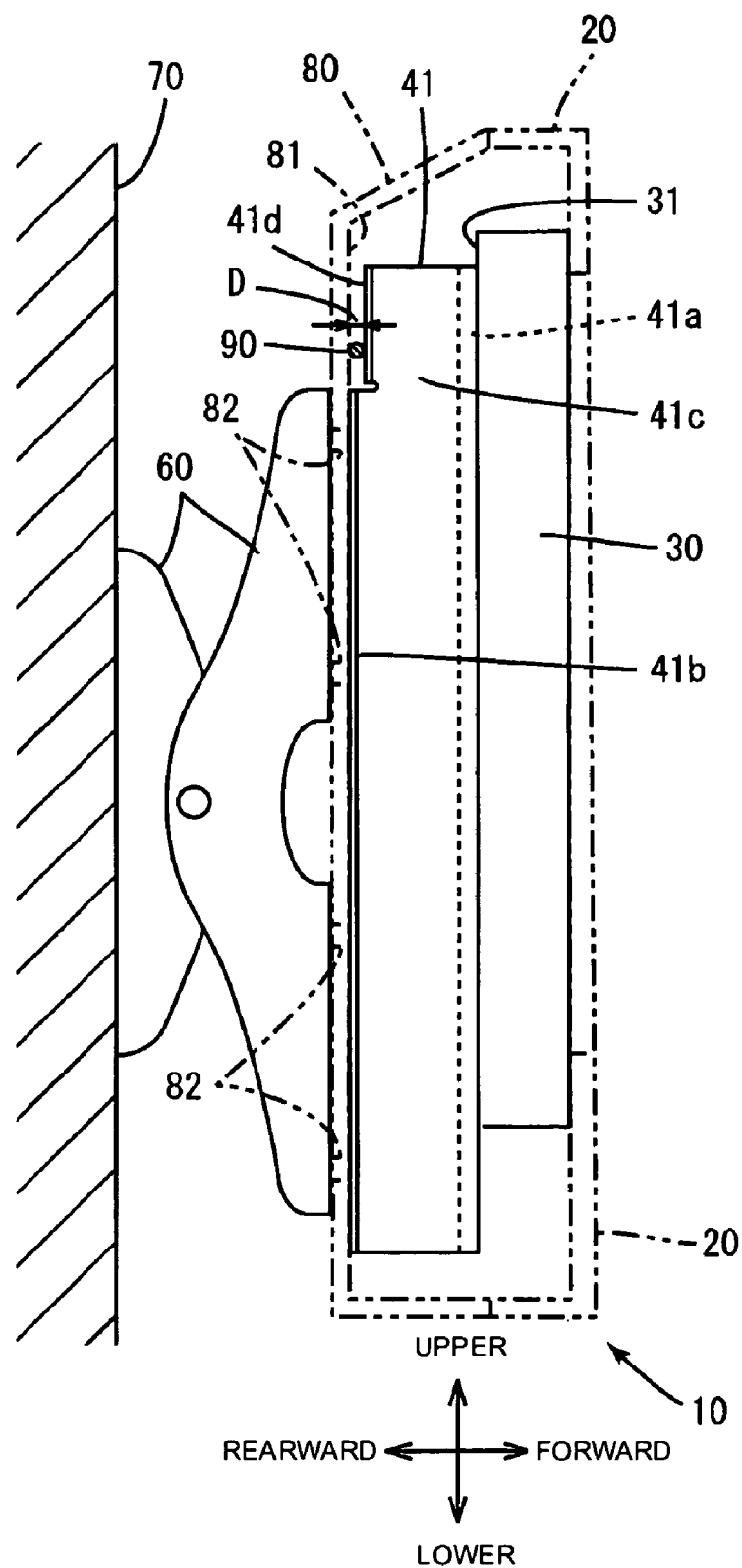
FIG. 5 is a side view of the television in a wall-hooked condition.
Figure 6:
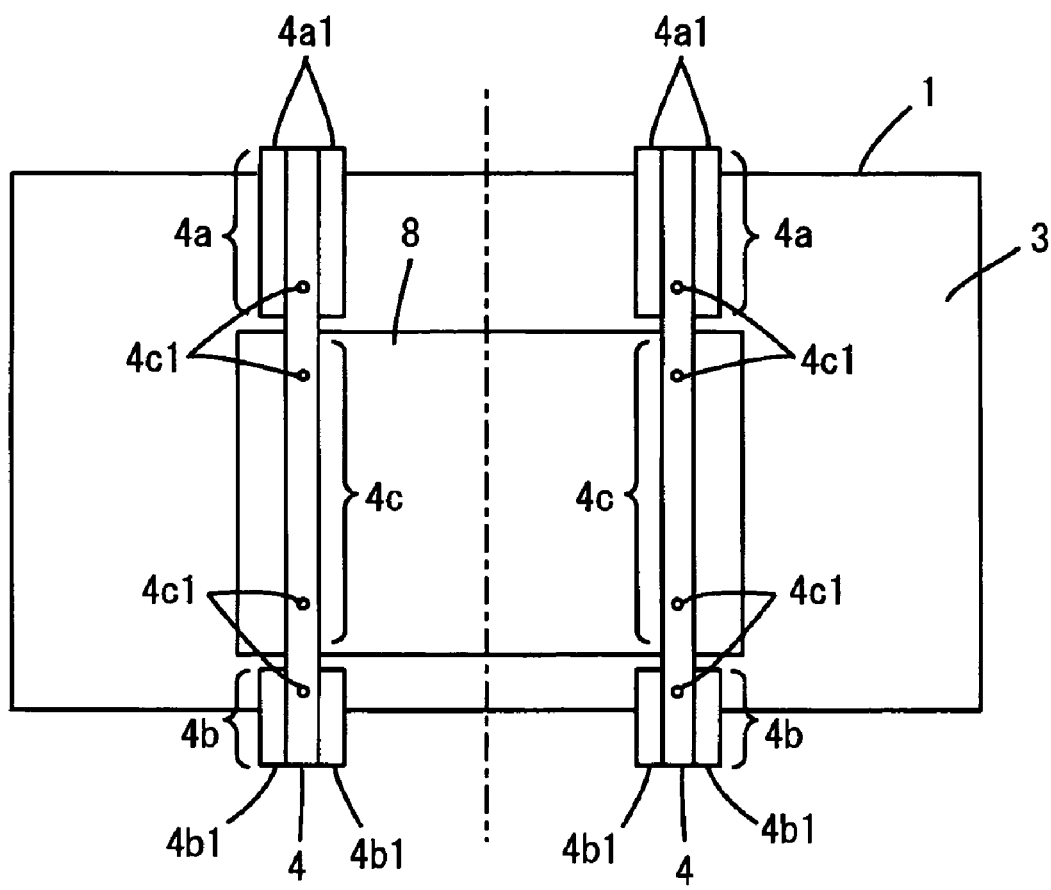
FIG. 6 is a rear view showing a relationship between a conventional display module and a conventional intermediate support member.
Figure 6:
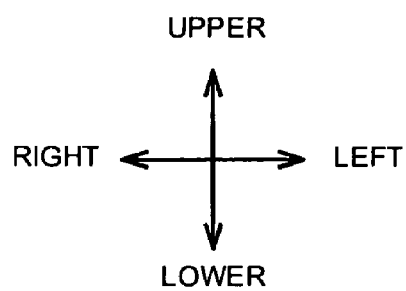
Figure 7:
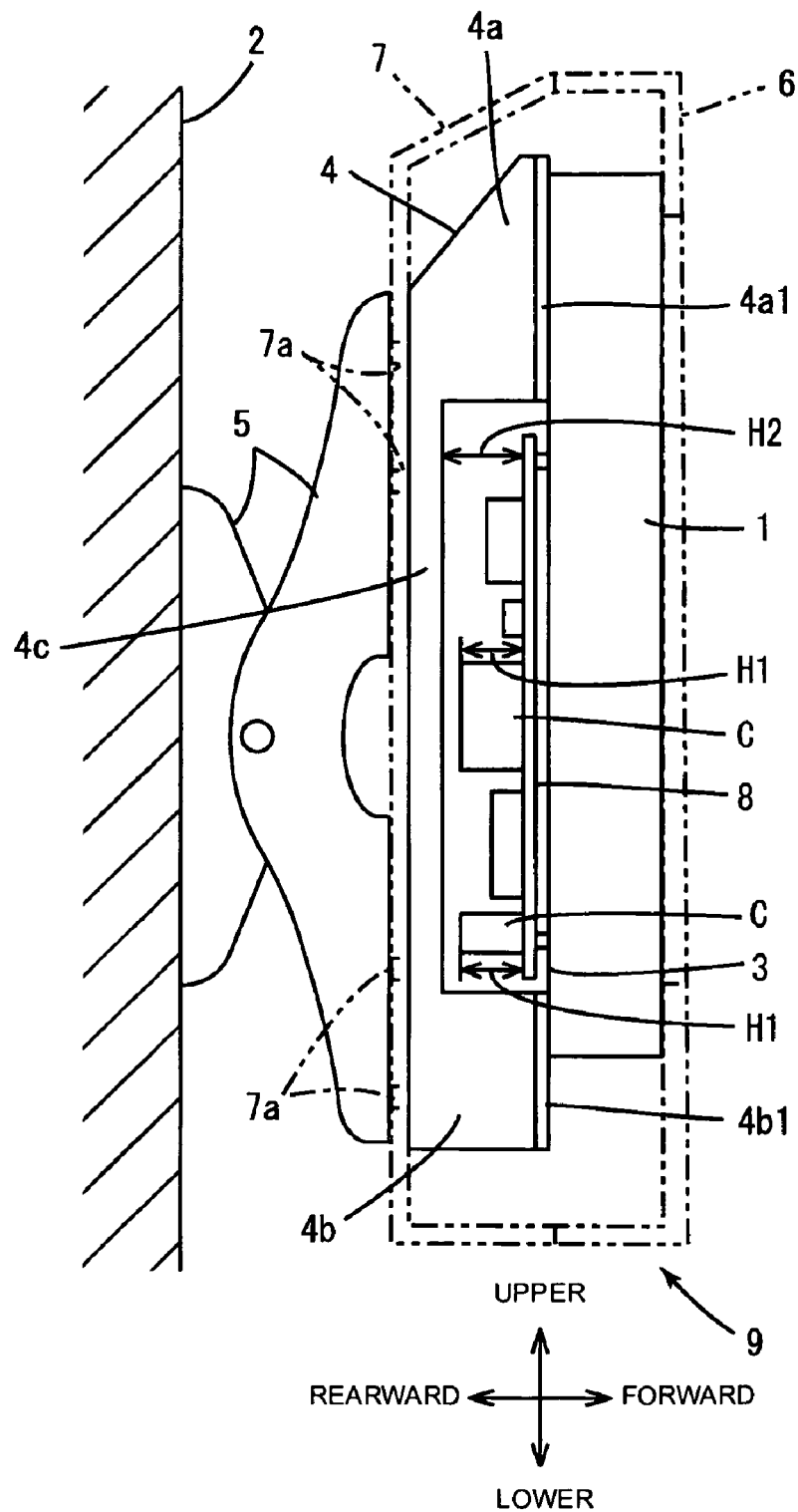
FIG. 7 is a side view showing the relationship between the conventional display module and the conventional intermediate support member.

FIG. 5 simply illustrates the TV 10, in a condition in which it is fixed to a wall 70 by a wall-hanging support fitting 60, as viewed from the left side.

As shown in FIG. 5, the predetermined wall-hanging support fitting 60 is fixed to the second fixing surface 41b of the intermediate support member 41 which is fixed onto the rear surface 31 of the display module 30, and a predetermined portion of a side of the wall-hanging support fitting 60 which is opposite to a side of the wall-hanging support fitting 60 which is fixed to the second fixing surface 41b is fixed onto the wall 70. Consequently, the TV 10 is supported in a wall-hung condition. The fixing of the intermediate support member 41 to the rear surface 31 is realized by screw-stopping using the fixing portions 41a4, which the first fixing surface 41a has, and screw-holes (not shown) formed in the rear surface 31. Incidentally, if irregularities (not shown) which coincide with the shapes of the surfaces 41a1, 41a2 of the first fixing surface 41a and the shape of the bent tip portion 41a3 are formed on the rear surface 31, the first fixing surface 41a can be stably fixed with respect to the rear surface 31.

The connection between the intermediate support member 41 and the wall-hanging support fitting 60 is realized by screw-stopping using the fixing portions 41b1, which the second fixing surface 41b has, and screw-holes (not shown) formed in the wall-hanging support fitting 60. While a fixing process for fixing the wall-hanging support fitting 60 with respect to the wall 70 is not particularly limited, the wall-hanging support fitting may be fixed by a conventional process. Incidentally, the intermediate support member 42 is concealed by the intermediate support member 41 in FIG. 5. However, it goes without saying that the intermediate support member 42 is also fixed with respect to the rear surface 31 and the wall-hanging support fitting 60 is also fixed to the intermediate support member 42.

In FIG. 5, the locations of the front cabinet 20 and a rear cabinet 80 which serve as parts of the housing body of the TV 10 are indicated by chain double-dashed lines. The front cabinet 20 covers the display module 30 from the front side. The rear cabinet 80 covers the interior of the TV 10 from the rear of the intermediate support members 41, 42 fixed to the rear surface 31, and is attached to a rear end of the front cabinet 20. The rear cabinet 80 is substantially abutted at regions of an inner surface 81 thereof against the second fixing surfaces 41b, 42b. Therefore, the rear cabinet 80 is formed, at locations positionally corresponding to the fixing portions 41b1, 42b1 in the regions thereof substantially abutted against the second fixing surfaces 41b, 42b, with through-holes 82 through which screws for fixing the second fixing surfaces 41b, 42b and the wall-hanging support fitting 60 are to be inserted. Incidentally, if the wall-hanging support fitting 60 is interposed between the rear of the TV 10 and the wall 70 and can be supported in air, it is sufficient and its shape, etc. are not particularly limited.

Moreover, in this embodiment, the cables 90 which make the connection between the components in the region, interposed by the intermediate support members 41, 42, and the components outside the same region are allowed to pass utilizing the difference D in level between the second fixing surface 41b (42b) and the surface 41d (42d). That is, even if the inner surface 81 of the rear cabinet 80 is in the condition of being substantially abutted against the second fixing surface 41b, 42b, the surfaces 41d, 42d are spaced apart from the inner surface 81 by a distance substantially equivalent to the difference D in level, so that by utilizing a space between the surfaces 41d, 42d and the inner surface 81, drawing-around of the cables 90 can be easily realized.

In the display module supporting structure according to this embodiment, as discussed above, the intermediate support members 41, 42 of substantially Z-shapes in cross-section are attached by causing the longitudinal directions thereof to be oriented in the upper and lower direction at the left and right locations outside the circuit boards 51, 52 carried on the rear surface 31 of the display module 30, and fixing the first fixing surfaces 41a, 42a thereof, and the external support member is fixed with respect to the second fixing surfaces 41b, 42b of the intermediate support members 41, 42, whereby effects as discussed hereinafter will be exerted.

In short, the intermediate support members 41, 42 do not straddle over the circuit boards 51, 52 (the rear side), so that between the circuit boards 51, 52 and the inner surface 81 of the rear cabinet 80, there are no obstructions to the heights of the various electronic components mounted on the circuit boards 51, 52. Particularly, components required to have certain high heights, such as a transformer of the power supply circuit, various heat sinks, various shield boxes, etc. are mounted on the circuit boards 51, 52, so that it is unnecessary to arrange these components so as to lay them on the boards as in the prior art, and unnecessary to specially select low height components and design circuits, and design of the circuit boards 51, 52 is easily performed.

Moreover, the intermediate support members 41, 42 are fixed outside the circuit boards 51, 52 on the rear surface 31, so that degrees of freedom in the places on the rear surface 31 at which the circuit boards 51, 52 are provided are improved. Particularly, degrees of freedom in the arranging locations in the upper and lower direction which are perfectly fixed by the upper and lower bridge leg portions 4a, 4b of the conventional intermediate support members (brackets 4) are considerably improved.

Moreover, operabilities in mounting of the intermediate support members 41, 42 and the circuit boards 51, 52 with respect to the rear surface 31 and removing of them are considerably improved. That is, the intermediate support members 41, 42 and the circuit boards 51, 52 are fixed to the locations that are not interfered with each other, so that the order of mounting them is not cared and operation of removing the circuit boards 51, 52 from the rear surface 31 after the intermediate support members 41, 42 are mounted is considerably easily performed.

Moreover, the intermediate support members 41, 42 are not the substantially arch-shaped those in which, as in the prior art, the portions of the sheet metals for the intermediate support members which correspond to the portions of the sheet metals between the portions of the sheet metals which correspond to the upper bridge leg portions 4a and the lower bridge leg portions 4b are cut away with the regions thereof corresponding to the connection portions 4c being left, so that the sheet metals used for forming the intermediate support members 41, 42 are not wasted, thus making it possible to correspondingly save the manufacturing cost of the TV 10. In addition, the intermediate support members 41, 42 are not formed in the substantially arch-shapes, so that the strengths of the intermediate support members are improved as compared with those of the conventional intermediate support members.

Moreover, the shapes of the intermediate support members 41, 42 also contribute to the reduction in a thickness of the TV 10. That is, if heights measured between the first fixing surfaces 41a, 42a and the second fixing surfaces 41b, 42b correspond to those measured between the rear surface 31 and tops of the components on the circuit boards 51, 52, they are sufficient. In other words, between the tops of the components on the circuit boards 51, 52 and the rear surface 81 of the rear cabinet 80, there are not such connection bridge portions 4c as in the conventional intermediate support members, so that a width of the TV 10 which is measured in the forward and rearward direction can be made thinner correspondingly to the absence of the connection bridge portions 4c.

Moreover, the left and right support members 41, 42 are arranged outside the circuit boards 51, 52, so that a distance between the left and right intermediate support members becomes wider, as compared to that between the conventional intermediate support members. Therefore, the strength of the TV 10 in the wall-hooked condition is enhanced as compared to that of the conventional TV in which the distance between the intermediate support members is narrow.

Incidentally, the display module supporting structure according to this embodiment can be applied to various panel-type display devices, for example, PDPs (plasma display panels), etc. as well as liquid crystal modules. Moreover, the TV 10 is not limited to the case where it is supported in the wall-hooked form and, in addition to this, may be supported on a floor through a stand member 100 (see FIG. 1). In this case, a left leg portion 100*a* which stands up from a base portion 100*c* of the sand member 100 is fixed to a lower end portion 41*e* of the intermediate support member 41 and a right leg portion 100*b* which stands up from the base portion 100*c* is fixed to a lower end portion 42*e* of the intermediate support member 42. The leg portion 100*a* and the leg portion 100*b* are fixed to any one of, or two or more of the first fixing surface, the connection surface and the second fixing surface of the intermediate support member 41, and any one of, or two or more of the first fixing surface, the connection surface and the second fixing surface of the intermediate support member 42, respectively, by screw-stopping. In this sense, it may safely be said that the stand member is also a kind of the external support member.

In accordance with another aspect of the present invention, there is provided a liquid crystal television which has all features of the display module supporting structure as described above and in which the present invention is concretely realized. The liquid crystal television includes a housing body; a liquid crystal module housed within the housing body; a circuit board mounted on a substantially central region of a rear surface of the liquid crystal module; the circuit board having electronic components for realizing drive of the liquid crystal television; an external support member for supporting the liquid crystal television from outside the housing body; the external support member is capable of causing the liquid crystal television to be supported in a wall-hung condition; and two intermediate support members for supporting the liquid crystal module; the intermediate support members are interposed between the rear surface of the liquid crystal module and the external support member; the intermediate support members are entirely made from sheet metals; said each intermediate support member, comprising: a first fixing surface of elongated plate-shape, including a plurality of different level surfaces; a connection surface of elongated plate-shape, rising up substantially perpendicularly to the first fixing surface from substantially entire region of an end portion of the first fixing surface along longitudinal direction of the first fixing surface; the connection surface has a planar recess portion in predetermined region of the connection surface; the connection surface has portions of different heights measured from the first fixing surface at an end portion of the connection surface, which is opposite to an end portion of the connection surface connected to the first fixing surface; and a second fixing surface of elongated plate-shape, substantially parallel to the first fixing surface and projecting in direction opposite to the first fixing surface from substantially entire region of a portion of the different height portions of the connection surface whose height from the first fixing surface is highest; the second fixing surface has screw-holes for fixing the external support member in predetermined locations of the second fixing surface; the intermediate support members are fixed at left and right locations on the rear surface outside the circuit board, with longitudinal directions of the intermediate support members oriented in an upper and lower direction of the rear surface of the liquid crystal module and with each second fixing surfaces of the intermediate support members projecting outside the circuit board; the first fixing surface and the second fixing surface are formed in such a manner that an end portion which is opposite to an end portion connected to the connection surface is bent partially; and the second fixing surface is configured to fix the external support member by screw-stopping using the screw-holes.

In such a concrete structure as to be discussed above, the same operation and effects as those attained in the display module supporting structure discussed above are attained.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A display module supporting structure, comprising:
   intermediate support members for supporting a display module housed within a housing body of a display device;
   the display module has a circuit board mounted on a rear surface of the display module;
   the intermediate support members are interposed between the rear surface of the display module and an external support member for supporting the display device from the outside of the housing body;
   said each intermediate support member comprising a first fixing elongated plate-shape plate fixed onto the rear surface of the display module, a second fixing elongated plate-shape plate substantially parallel to the first fixing elongated plate-shape plate and has fixing portions for fixing the external support member in predetermined locations of the second fixing elongated plate-shape plate, and a connection elongated plate-shape plate interconnecting the first fixing elongated plate-shape plate and the second fixing elongated plate-shape plate and substantially perpendicular to the first fixing elongated plate-shape plate and the second fixing elongated plate-shape plate; and
   the intermediate support members are fixed to left and right locations on the rear surface outside the circuit board;
   wherein the intermediate support member is formed in such a manner that the connection elongated plate-shape plate rise up from an end portion of the first fixing elongated plate-shape plate which is arranged remote from the circuit board when the intermediate support member is fixed to the rear surface, and the second fixing elongated plate-shape plate projects in direction opposite to the first fixing elongated plate-shape plate from an end portion of the connection elongated plate-shape plate which is opposite to an end portion of the connection elongated plate-shape plate connected to the first fixing elongated plate-shape plate, in such a manner that the connection elongated plate-shape plate is interposed between the first fixing elongated plate-shape plate and the second fixing elongated plate-shape plate.

2. A display module supporting structure according to claim 1, wherein the connection elongated plate-shape plate has portions of different heights from the first fixing elongated plate-shape plate at an end portion of the connection elongated plate-shape plate opposite to an end portion of the connection elongated plate-shape plate connected to the first fixing elongated plate-shape plate, and the second fixing elongated plate-shape plate is connected to a portion of the different height portions whose height from the first fixing elongated plate-shape plate is highest.

3. A display module supporting structure according to claim 1, wherein the connection elongated plate-shape plate has planar recess portion in predetermined region of the connection elongated plate-shape plate.

4. A display module supporting structure according to claim 1, wherein at least one of the first fixing elongated plate-shape plate and the second fixing elongated plate-shape plate is formed in such a manner that an end portion of the at least one fixing elongated plate-shape plate which is opposite to an end portion thereof connected to the connection elongated plate-shape plate is bent entirely or partially.

5. A display module supporting structure according to claim 1, wherein the external support member is adapted to be able to cause the display device to be supported in a wall-hung condition, and the second fixing elongated plate-shape plate is adapted to fix the external support member utilizing the fixing portions.

* * * * *